United States Patent
Murakami

(10) Patent No.: US 11,555,625 B2
(45) Date of Patent: Jan. 17, 2023

(54) AIR CONDITIONING CONTROL SYSTEM

(71) Applicant: Mitsubishi Electric Corporation, Tokyo (JP)

(72) Inventor: Yoshiro Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/287,577

(22) PCT Filed: Jan. 17, 2019

(86) PCT No.: PCT/JP2019/001285
§ 371 (c)(1),
(2) Date: Apr. 22, 2021

(87) PCT Pub. No.: WO2020/148864
PCT Pub. Date: Jul. 23, 2020

(65) Prior Publication Data
US 2021/0318016 A1    Oct. 14, 2021

(51) Int. Cl.
*F24F 11/61* (2018.01)
*F24F 11/62* (2018.01)
(Continued)

(52) U.S. Cl.
CPC .............. *F24F 11/62* (2018.01); *F24F 11/30* (2018.01); *F24F 11/56* (2018.01); *F24F 11/61* (2018.01);
(Continued)

(58) Field of Classification Search
CPC .. F24F 11/62; F24F 11/30; F24F 11/56; F24F 11/61; F24F 11/64; F24F 2120/12;
(Continued)

(56) References Cited

U.S. PATENT DOCUMENTS

| | | | | |
|---|---|---|---|---|
| 2013/0073094 A1* | 3/2013 | Knapton | ................. | F24F 11/30 700/278 |
| 2015/0267935 A1* | 9/2015 | Devenish | ................. | F24F 11/30 700/278 |

(Continued)

FOREIGN PATENT DOCUMENTS

| | | |
|---|---|---|
| CN | 103994544 A | 8/2014 |
| CN | 104807135 A | 7/2015 |

(Continued)

OTHER PUBLICATIONS

Office Action dated Feb. 22, 2022 issued in corresponding Indian patent application No. 202127025510. (Please note that reference listed in the Indian Office Action as JP201300098A is incorrect. The correct reference number is JP2013200098A published on Oct. 3, 2013. This references was previously filed with the USPTO in our IDS filed on Apr. 22, 2021).

(Continued)

*Primary Examiner* — Michael W Choi
(74) *Attorney, Agent, or Firm* — Posz Law Group, PLC

(57) ABSTRACT

An air conditioning control system includes a plurality of remote control terminals and a server. The plurality of remote control terminals each calculates a time required for a user of the remote control terminal to return to a building from outside the building, and transmits information indicating the time required to the server. The server calculates an estimated time when a user who returns to the building first among the plurality of users returns to the building on the basis of the time required, and transmits a command for changing air conditioning setting to an air conditioner in stages from a time when the estimated time is calculated to the estimated time calculated.

7 Claims, 5 Drawing Sheets

(51) Int. Cl.
  *F24F 11/64* (2018.01)
  *F24F 11/30* (2018.01)
  *F24F 11/56* (2018.01)
  *G05B 19/042* (2006.01)
  *F24F 140/60* (2018.01)
  *F24F 120/12* (2018.01)

(52) U.S. Cl.
  CPC ............ *F24F 11/64* (2018.01); *G05B 19/042* (2013.01); *F24F 2120/12* (2018.01); *F24F 2140/60* (2018.01); *G05B 2219/2614* (2013.01)

(58) Field of Classification Search
  CPC ........ F24F 2140/60; F24F 11/46; F24F 11/48; G05B 19/042; G05B 2219/2614; G05B 15/02; H04M 11/00; H04Q 9/00
  See application file for complete search history.

(56) References Cited

U.S. PATENT DOCUMENTS

| | | | |
|---|---|---|---|
| 2015/0323943 A1* | 11/2015 | Chan .................. | G05B 15/02 700/278 |
| 2015/0338116 A1 | 11/2015 | Furuta et al. | |
| 2017/0285596 A1* | 10/2017 | Hunt .................. | G05B 15/02 |
| 2018/0045426 A1 | 2/2018 | Kanada | |
| 2018/0045474 A1 | 2/2018 | Yoshikawa | |
| 2019/0086114 A1* | 3/2019 | Nakashima ............ | G05B 15/02 |

FOREIGN PATENT DOCUMENTS

| | | |
|---|---|---|
| CN | 103994545 B | 6/2017 |
| EP | 3040633 A1 * | 6/2016 |
| JP | 2004/297112 A | 10/2004 |
| JP | 2013/200098 A | 10/2013 |
| JP | 2014-240729 A | 12/2014 |
| JP | 2016/169938 A | 9/2016 |
| WO | 2014/188670 A1 | 11/2014 |
| WO | 2016/157283 A1 | 10/2016 |
| WO | 2017/179386 A1 | 10/2017 |

OTHER PUBLICATIONS

International Search Report of the International Searching Authority dated Apr. 2, 2019 for the corresponding International application No. PCT/JP2019/001285 (and English translation).
Office Action dated Feb. 28, 2022 for the corresponding Australian patent application No. 2019422797.
Office Action dated Apr. 28, 2022 in corresponding Chinese Patent Application No. 201980088475.1 (with English translation).
Office Action dated Sep. 7, 2022 issued in corresponding Turkish Patent Application No. 2021/008958 (and English machine translation).
Office Action dated Oct. 20, 2022 issued in corresponding CN Patent Application No. 201980088475.1 (and partial English translation).

* cited by examiner

AIR CONDITIONING CONTROL SYSTEM

CROSS REFERENCE TO RELATED APPLICATION

This application is a U.S. national stage application of International Patent Application No. PCT/JP2019/001285 filed on Jan. 17, 2019, the disclosure of which is incorporated herein by reference.

TECHNICAL FIELD

The present invention relates to an air conditioning control system that controls an air conditioner by using information indicating a position of a remote control terminal.

BACKGROUND

An air conditioning control system that controls an air conditioner by using information indicating a position of a terminal device is known (see, for example, Patent Literature 1). A conventional air conditioning control system includes a terminal device, a wearable terminal, and an air conditioner that performs air conditioning under the control of the terminal device. The terminal device includes a function of remotely controlling the air conditioner and a function of detecting a position of the terminal device. The wearable terminal includes a function of detecting temperature around a user.

PATENT LITERATURE

Patent Literature 1: International Publication No. WO 2016/157283

However, the conventional air conditioning control system does not take into account a mode in which a plurality of users is associated with one air conditioner. When the plurality of users is associated with the one air conditioner, and the plurality of users includes a user who returns home relatively early and a user who returns home relatively late, it is required to provide a technique that properly executes air conditioning for the plurality of users.

SUMMARY

The present invention has been made in view of the above, and an object of the present invention is to provide an air conditioning control system that properly executes air conditioning for a plurality of users when the plurality of users is associated with one air conditioner, and the plurality of users includes a user who arrives at a building from outside the building relatively early and a user who arrives thereat relatively late.

In order to solve the above problem and achieve the object, an air conditioning control system according to the present invention includes an air conditioner, a plurality of remote control terminals each including a function of remotely controlling the air conditioner, and a server for controlling the air conditioner. The air conditioner includes an outdoor unit including a temperature sensor that detects temperature of outside air. The plurality of remote control terminals each includes a position detection unit, a travel speed acquisition unit, a terminal storage unit that stores information indicating a position of a building where the air conditioner is installed, a terminal control unit, and a terminal communication unit. The position detection unit detects a current position of a remote control terminal including the position detection unit. The travel speed acquisition unit measures a speed of travel of a remote control terminal including the travel speed acquisition unit. The terminal control unit calculates a time required for a user of a remote control terminal including the terminal control unit to arrive at the building from outside the building on the basis of information obtained from the position detection unit, the travel speed acquisition unit, and the terminal storage unit of the remote control terminal including the terminal control unit. The terminal communication unit transmits, to the server, information indicating the time required that is calculated by the terminal control unit of a remote control terminal including the terminal communication unit. The server includes a server storage unit storing a database that associates the air conditioner with the user of each of the plurality of remote control terminals, a server communication unit that receives the information indicating the time required for the user of each of the plurality of remote control terminals from each of the plurality of remote control terminals, a server control unit that controls the server communication unit, and a calculation unit that calculates, on the basis of the information received by the server communication unit, an estimated time at which a user who arrives at the building first arrives at the building among the plurality of users indicated by information included in the database. The server communication unit transmits a command for changing air conditioning setting to the air conditioner in stages from a time when the calculation unit calculates the estimated time to the estimated time calculated by the calculation unit. The server control unit causes the server communication unit to transmit the command for changing air conditioning setting to the air conditioner such that a difference between the temperature of the outside air and a target indoor temperature falls within a predetermined range just before the time at which the user who arrives at the building first arrives at the building.

The air conditioning control system according to the present invention can properly execute air conditioning for the plurality of users when the plurality of users is associated with one air conditioner, and the plurality of users includes the user who arrives at the building from outside the building relatively early and the user who arrives thereat relatively late.

DESCRIPTION OF EMBODIMENTS

An air conditioning control system according to embodiments of the present invention will now be described in detail with reference to the drawings. Note that the present invention is not limited to the embodiments.

First Embodiment

Figure 1:
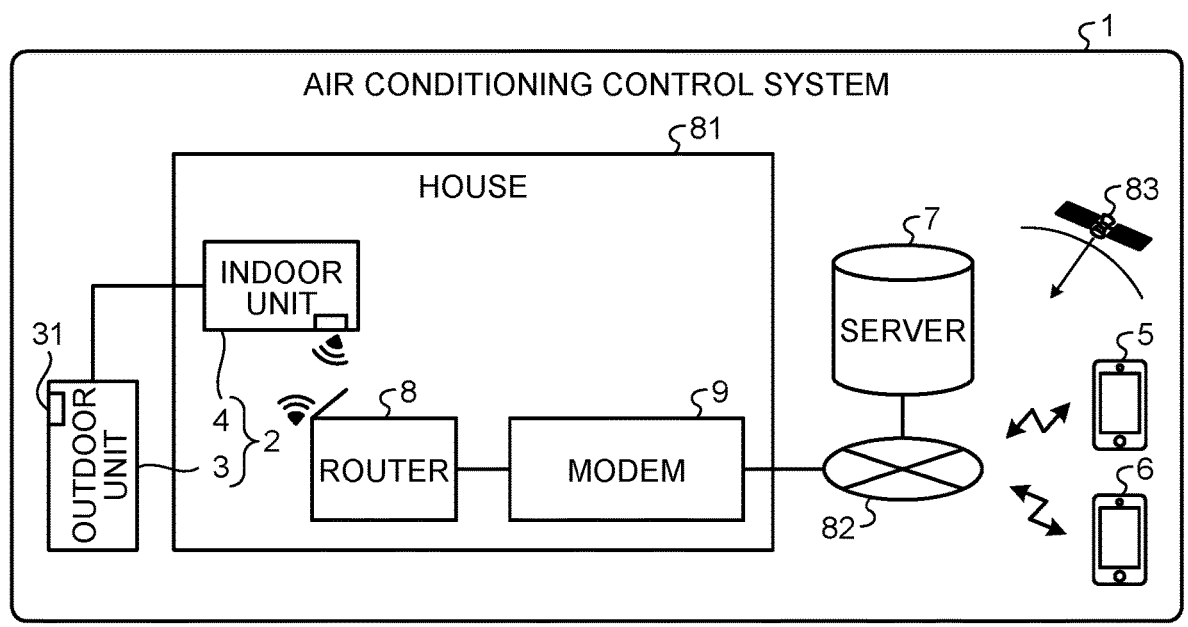
FIG. 1 is a first diagram illustrating a configuration of an air conditioning control system according to a first embodiment.

FIG. 1 is a first diagram illustrating a configuration of an air conditioning control system 1 according to a first embodiment. The air conditioning control system 1 includes an air conditioner 2. The air conditioner 2 includes an outdoor unit 3 and an indoor unit 4, the outdoor unit 3 including a temperature sensor 31 that detects the temperature of the outside air. The outdoor unit 3 is installed outside a house 81, and the indoor unit 4 is installed inside the house 81. The house 81 is an example of a building.

The air conditioning control system 1 further includes a first remote control terminal 5 and a second remote control terminal 6 each including a function of remotely controlling the air conditioner 2. That is, the first remote control terminal 5 and the second remote control terminal 6 both include the function of remotely controlling the indoor unit 4. The first remote control terminal 5 and the second remote control terminal 6 are examples of a plurality of remote control terminals. The first remote control terminal 5 and the second remote control terminal 6 are both devices that can be carried by a user.

The air conditioning control system 1 further includes a server 7 for controlling the air conditioner 2. The server 7 is installed outside the house 81. The server 7 is connected to Internet 82. The Internet 82 is located outside the house 81. The air conditioning control system 1 further includes a router 8 connected to the indoor unit 4 by a wireless local area network. The router 8 is installed inside the house 81. The air conditioning control system 1 further includes a modem 9 connected to the router 8. The modem 9 is installed inside the house 81. The modem 9 is also connected to the Internet 82.

As described above, the router 8 is connected to the indoor unit 4, and the modem 9 is connected to the router 8 and the Internet 82. That is, the indoor unit 4 is connected to the Internet 82 via the router 8 and the modem 9. The first remote control terminal 5 and the second remote control terminal 6 are both connected to the server 7. As described above, the server 7 is connected to the Internet 82. That is, the first remote control terminal 5 and the second remote control terminal 6 are both connected to the indoor unit 4 via the server 7, the Internet 82, the modem 9, and the router 8.

The indoor unit 4 may be connected to the Internet 82 by a connection method other than the connection method described above. For example, the indoor unit 4 may be connected to the Internet 82 using a part or all of a wired local area network, Bluetooth (registered trademark), and a specified low power radio.

The first remote control terminal 5 includes a function of receiving radio waves from a plurality of global positioning system satellites and detecting the current position of the first remote control terminal 5 on the basis of the radio waves received. The second remote control terminal 6 includes a function of receiving radio waves from a plurality of global positioning system satellites and detecting the current position of the second remote control terminal 6 on the basis of the radio waves received. FIG. 1 illustrates only one global positioning system satellite 83 among the plurality of global positioning system satellites. A method of detecting the current position of each of the plurality of remote control terminals is not limited to the method of using the radio waves from the plurality of global positioning system satellites.

Figure 2:
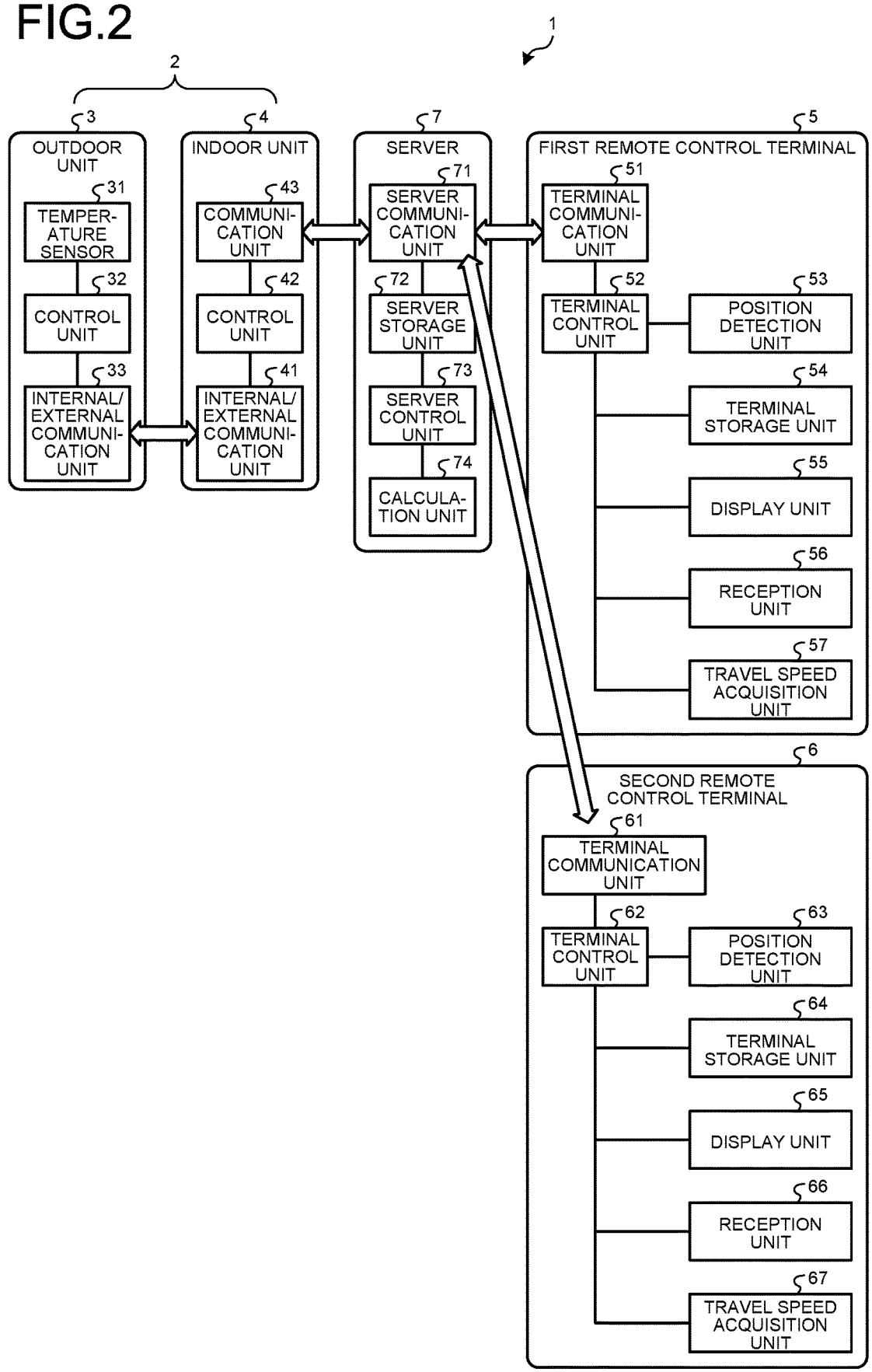
FIG. 2 is a second diagram illustrating the configuration of the air conditioning control system according to the first embodiment.

FIG. 2 is a second diagram illustrating the configuration of the air conditioning control system 1 according to the first embodiment. As described above, the outdoor unit 3 includes the temperature sensor 31 that detects the temperature of the outside air. The temperature sensor 31 is, for example, a thermistor or a temperature sensor integrated circuit. The outdoor unit 3 further includes a control unit 32 that controls air conditioning, and an internal/external communication unit 33 that communicates with the indoor unit 4.

The control unit 32 controls, for example, a compressor and an outdoor unit fan (not shown) as well as the flow rate of a refrigerant. The control unit 32 controls the internal/external communication unit 33 to transmit information indicating the temperature detected by the temperature sensor 31 to the indoor unit 4 in a predetermined cycle. The internal/external communication unit 33 need not transmit the information indicating the temperature detected by the temperature sensor 31 to the indoor unit 4 in the above cycle.

The internal/external communication unit 33 may transmit the information indicating the temperature detected by the temperature sensor 31 to the indoor unit 4 at a timing when the temperature detected by the temperature sensor 31 changes. The internal/external communication unit 33 may transmit the information indicating the temperature detected by the temperature sensor 31 to the indoor unit 4 in the above cycle and also at the timing when the temperature detected by the temperature sensor 31 changes.

The indoor unit 4 includes an internal/external communication unit 41 that communicates with the outdoor unit 3, a control unit 42 that controls air conditioning, and a communication unit 43 that communicates with the router 8. As described above, the indoor unit 4 is connected to the Internet 82 via the router 8 and the modem 9. The server 7 is connected to the Internet 82. That is, the communication unit 43 communicates with the server 7 via the router 8, the modem 9, and the Internet 82. The communication unit 43 may be placed inside the indoor unit 4 or may be attached to the outside of a casing of the indoor unit 4.

The control unit 42 controls, for example, an indoor unit fan, a flap, and a louver (not shown). In addition, the control unit 42 controls the communication unit 43 to transmit, to the server 7, the information indicating the temperature detected by the temperature sensor 31, the information being received from the outdoor unit 3 by the internal/external communication unit 41. When transmitting the information indicating the temperature detected by the temperature sensor 31 to the server 7, the communication unit 43 transmits information indicating a target indoor temperature to the server 7.

The indoor unit 4 also includes a function of receiving an infrared signal from a remote control and performing air conditioning in conjunction with the outdoor unit 3 on the basis of the signal received, the infrared signal corresponding to an operation performed on the remote control by a user inside the house 81. The indoor unit 4 also includes a function of performing air conditioning in conjunction with the outdoor unit 3 on the basis of data transmitted from the server 7 for controlling air conditioning.

The first remote control terminal 5 includes a terminal communication unit 51 that communicates with the server 7 via the Internet 82, a terminal control unit 52 that controls the components of the first remote control terminal 5, and a position detection unit 53 that detects the current position of the first remote control terminal 5. For example, the position detection unit 53 detects the current position of the first remote control terminal 5 on the basis of the radio waves from the plurality of global positioning system satellites. The position detection unit 53 may detect the current position of the first remote control terminal 5 by a method other than the method of using the radio waves from the plurality of global positioning system satellites.

The first remote control terminal 5 further includes a terminal storage unit 54 that stores information indicating the position of the house 81 in which the air conditioner 2, specifically the indoor unit 4, is installed. The terminal storage unit 54 also stores identification information of a user of the first remote control terminal 5. The terminal storage unit 54 is implemented by a semiconductor memory, for example. The first remote control terminal 5 further includes a display unit 55 that displays an air conditioning state of the indoor unit 4. The terminal communication unit 51 receives information indicating the air conditioning state of the indoor unit 4 from the server 7, and the display unit 55 displays the air conditioning state of the indoor unit 4 under the control of the terminal control unit 52 on the basis of the information received by the terminal communication unit 51. The display unit 55 is implemented by a liquid crystal display device, for example.

The first remote control terminal 5 further includes a reception unit 56 that receives an instruction regarding air conditioning of the indoor unit 4 from the user of the first remote control terminal 5. The reception unit 56 also includes a function of receiving information related to the user of the first remote control terminal 5. An example of the information related to the user of the first remote control terminal 5 is the identification information of the user of the first remote control terminal 5. The identification information stored in the terminal storage unit 54 is information that is input to the first remote control terminal 5 by the user of the first remote control terminal 5 using the reception unit 56 and is received by the reception unit 56. For example, a part of the reception unit 56 is a keyboard, an operation button, or a device that reads information from a recording medium. The display unit 55 and the reception unit 56 may be implemented by one touch panel.

The first remote control terminal 5 further includes a travel speed acquisition unit 57 that measures the speed of travel of the first remote control terminal 5. For example, the travel speed acquisition unit 57 measures the speed of travel of the first remote control terminal 5 using an acceleration sensor. The travel speed acquisition unit 57 may measure the speed of travel of the first remote control terminal 5 on the basis of a change in the current position detected by the position detection unit 53.

The terminal control unit 52 calculates a time required for the user of the first remote control terminal 5 to return to the house 81 from outside the house 81 on the basis of information obtained from the position detection unit 53, the terminal storage unit 54, and the travel speed acquisition unit 57. Specifically, the terminal control unit 52 calculates the time required for the user of the first remote control terminal 5 to return to the house 81 from outside the house 81 on the basis of the current position of the first remote control terminal 5 detected by the position detection unit 53, the information indicating the position of the house 81 stored in the terminal storage unit 54, and the speed of travel of the first remote control terminal 5 measured by the travel speed acquisition unit 57.

The terminal communication unit 51 transmits information indicating the time required calculated by the terminal control unit 52 to the server 7. For example, the terminal communication unit 51 transmits the information indicating the time required to the server 7 at predetermined time intervals. The terminal communication unit 51 may transmit information indicating a new time required to the server 7 when a difference between the time required, which is indicated by the information previously transmitted to the server 7, and the new time required, which is calculated by the terminal control unit 52 after the transmission of the previous information, exceeds a predetermined time.

The terminal communication unit 51 transmits the information indicating the new time required to the server 7 when, for example, the time obtained by subtracting an "elapsed time" and the "new time required calculated by the terminal control unit 52 after the transmission of the previous information" from the "time required indicated by the information previously transmitted" exceeds "10 minutes". The "elapsed time" is the time from the time when the previous information is transmitted to the time when the terminal control unit 52 calculates the new time required after the transmission of the previous information.

The second remote control terminal 6 includes a terminal communication unit 61 that communicates with the server 7 via the Internet 82, a terminal control unit 62 that controls the components of the second remote control terminal 6, and a position detection unit 63 that detects the current position of the second remote control terminal 6. For example, the position detection unit 63 detects the current position of the second remote control terminal 6 on the basis of the radio waves from the plurality of global positioning system satellites. The position detection unit 63 may detect the current position of the second remote control terminal 6 by a method other than the method of using the radio waves from the plurality of global positioning system satellites.

The second remote control terminal 6 further includes a terminal storage unit 64 that stores information indicating the position of the house 81 in which the air conditioner 2, specifically the indoor unit 4, is installed. The terminal storage unit 64 also stores identification information of a user of the second remote control terminal 6. The terminal storage unit 64 is implemented by a semiconductor memory, for example. The second remote control terminal 6 further includes a display unit 65 that displays an air conditioning state of the indoor unit 4. The terminal communication unit 61 receives information indicating the air conditioning state of the indoor unit 4 from the server 7, and the display unit 65 displays the air conditioning state of the indoor unit 4 under the control of the terminal control unit 62 on the basis of the information received by the terminal communication unit 61. The display unit 65 is implemented by a liquid crystal display device, for example.

The second remote control terminal 6 further includes a reception unit 66 that receives an instruction regarding air conditioning of the indoor unit 4 from the user of the second remote control terminal 6. The reception unit 66 also includes a function of receiving information related to the user of the second remote control terminal 6. An example of the information related to the user of the second remote control terminal 6 is the identification information of the user of the second remote control terminal 6. The identification information stored in the terminal storage unit 64 is information that is input to the second remote control terminal 6 by the user of the second remote control terminal 6 using the reception unit 66 and is received by the reception unit 66. For example, a part of the reception unit 66 is a keyboard, an operation button, or a device that reads information from a recording medium. The display unit 65 and the reception unit 66 may be implemented by one touch panel.

The second remote control terminal 6 further includes a travel speed acquisition unit 67 that measures the speed of travel of the second remote control terminal 6. For example, the travel speed acquisition unit 67 measures the speed of travel of the second remote control terminal 6 using an acceleration sensor. The travel speed acquisition unit 67 may measure the speed of travel of the second remote control terminal 6 on the basis of a change in the current position detected by the position detection unit 63.

The terminal control unit 62 calculates a time required for the user of the second remote control terminal 6 to return to the house 81 from outside the house 81 on the basis of information obtained from the position detection unit 63, the terminal storage unit 64, and the travel speed acquisition unit 67. Specifically, the terminal control unit 62 calculates the time required for the user of the second remote control terminal 6 to return to the house 81 from outside the house 81 on the basis of the current position of the second remote control terminal 6 detected by the position detection unit 63, the information indicating the position of the house 81 stored in the terminal storage unit 64, and the speed of travel of the second remote control terminal 6 measured by the travel speed acquisition unit 67.

The terminal communication unit 61 transmits information indicating the time required calculated by the terminal control unit 62 to the server 7. For example, the terminal communication unit 61 transmits the information indicating the time required to the server 7 at predetermined time intervals. The terminal communication unit 61 may transmit information indicating a new time required to the server 7 when a difference between the time required, which is indicated by the information previously transmitted to the server 7, and the new time required, which is calculated by the terminal control unit 62 after the transmission of the previous information, exceeds a predetermined time.

The terminal communication unit 61 transmits the information indicating the new time required to the server 7 when, for example, the time obtained by subtracting an "elapsed time" and the "new time required calculated by the terminal control unit 62 after the transmission of the previous information" from the "time required indicated by the information previously transmitted" exceeds "10 minutes". The "elapsed time" is the time from the time when the previous information is transmitted to the time when the terminal control unit 62 calculates the new time required after the transmission of the previous information.

The server 7 includes a server communication unit 71 that communicates with the indoor unit 4 and the plurality of remote control terminals. The server communication unit 71 includes a function of receiving information indicating the time required for the user of each of the plurality of remote control terminals from each of the plurality of remote control terminals. As described above, the first remote control terminal 5 and the second remote control terminal 6 are examples of the plurality of remote control terminals.

The server 7 further includes a server storage unit 72 that stores information, and a server control unit 73 that controls to store information in the server storage unit 72. Specifically, the server control unit 73 controls to store information obtained from the indoor unit 4 in the server storage unit 72. The server storage unit 72 is implemented by a semiconductor memory, for example. The information obtained from the indoor unit 4 is received by the server communication unit 71. An Example of the information obtained from the indoor unit 4 is a part or all of information indicating the temperature of the outside air, information indicating the target indoor temperature, information indicating whether the indoor unit 4 is operating or stopped, information indicating the operation mode, information indicating the wind direction, information indicating the air volume, information indicating an abnormality in the event of the abnormality, individual identification information of the indoor unit 4, and information related to the outdoor unit 3. The individual identification information of the indoor unit 4 is, for example, one or both of information indicating a media access control (MAC) address of the indoor unit 4 and information indicating a serial number of the indoor unit 4.

The server control unit 73 also includes a function of controlling to store, in the server storage unit 72, information that the server communication unit 71 receives from the plurality of remote control terminals. Examples of the information that the server communication unit 71 receives from the plurality of remote control terminals are the identification information of the user of each of the plurality of remote control terminals transmitted from each of the plurality of remote control terminals, the information indicating the time required for the user of each of the plurality of remote control terminals, and operation information regarding air conditioning. The time required for each user is the time required for the user to return to the house 81 from outside the house 81.

The server storage unit 72 stores a database in which the air conditioner 2 is associated with the user of each of the plurality of remote control terminals. The database is an aggregate of information in which the identification information, the information indicating the time required, and the operation information regarding air conditioning are associated with one another for each user. Note that the time required for a user who is in the house 81 is zero minute. In the first embodiment, the air conditioner 2 is associated with the user of each of the plurality of remote control terminals on the basis of the individual identification information of the indoor unit 4 and the identification information of the user.

The server control unit 73 causes the server communication unit 71 to transmit, to the indoor unit 4, the information indicating the target indoor temperature and the information instructing the indoor unit 4 to operate or stop on the basis of the time required for the user of each of the plurality of remote control terminals associated with the air conditioner 2 and the temperature of the outside air.

The server 7 further includes a calculation unit 74 that calculates, on the basis of the information received by the server communication unit 71, an estimated time when a user who returns to the house 81 first returns to the house 81 among the plurality of users indicated by the information included in the database that is stored in the server storage unit 72. The server communication unit 71 transmits a command for changing the air conditioning setting to the air conditioner 2 in stages from a time when the calculation unit 74 calculates the estimated time to the estimated time calculated by the calculation unit 74.

Figure 3:
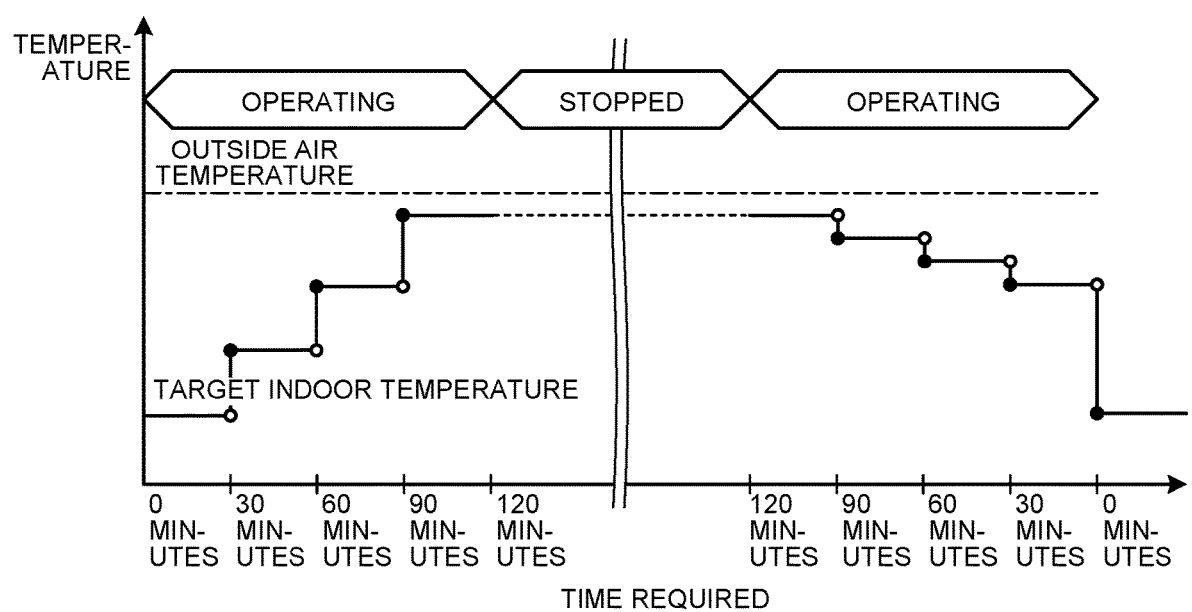
FIG. 3 is a graph illustrating an example of the operation of an air conditioner included in the air conditioning control system according to the first embodiment when a cooling mode is set as the operation mode of the air conditioner.

FIG. 3 is a graph illustrating an example of the operation of the air conditioner 2 included in the air conditioning control system 1 according to the first embodiment when a cooling mode is set as the operation mode of the air conditioner 2. More specifically, FIG. 3 illustrates an example of the command for changing the air conditioning setting from when all the users associated with the air conditioner 2 are out of the house 81 to when the user who first returns to the house thereafter returns to the house. In FIG. 3, "OPERATING" indicates that the air conditioner 2 is operating. In FIG. 3, "STOPPED" indicates that the operation of the air conditioner 2 is stopped.

The following description assumes that the plurality of remote control terminals is the first remote control terminal 5 and the second remote control terminal 6. First, the server control unit 73 of the server 7 includes, in the database, information indicating the target indoor temperature at a time point when the time required for the first remote control terminal 5 or the time required for the second remote control terminal 6 is zero minute. The time point when the time required is zero minute on the left side of FIG. 3 is a time point when the user who goes out later goes out between the user of the first remote control terminal 5 and the user of the second remote control terminal 6.

When the time required for the first remote control terminal 5 and the time required for the second remote control terminal 6 are both no longer zero minute, the server control unit 73 determines that the user of the first remote control terminal 5 and the user of the second remote control terminal 6 have both gone out, and starts controlling the command for changing the air conditioning setting. Upon determining that the user of the first remote control terminal 5 and the user of the second remote control terminal 6 have both gone out, the server control unit 73 controls the command for changing the air conditioning setting using the shorter time required between the time required for the first remote control terminal 5 and the time required for the second remote control terminal 6.

The server control unit 73 causes the server communication unit 71 to transmit the command for changing the air conditioning setting to the indoor unit 4 in stages such that the target indoor temperature is gradually increased as the time required increases. Once the time required is a first reference time or longer, the server control unit 73 causes the server communication unit 71 to transmit a command for stopping the operation to the indoor unit 4. The example of FIG. 3 sets the first reference time to 120 minutes. The control performed by the server control unit 73 once the time required is the first reference time or longer allows the air conditioning control system 1 to reduce the power consumed by the air conditioner 2 when the user of the first remote control terminal 5 and the user of the second remote control terminal 6 have both gone out. That is, the air conditioning control system 1 can perform energy-saving air conditioning.

Once the time required is less than a second reference time, the server control unit 73 causes the server communication unit 71 to transmit a command for starting the operation to the indoor unit 4. As in the example of FIG. 3, the first reference time and the second reference time may be the same. The server control unit 73 causes the server communication unit 71 to transmit the command for changing the air conditioning setting to the indoor unit 4 in stages such that the target indoor temperature is gradually decreased as the time required decreases.

The server control unit 73 causes the server communication unit 71 to transmit the command for changing the air conditioning setting to the indoor unit 4 in stages such that a difference between the temperature of the outside air and the target indoor temperature falls within a predetermined range just before the time required reaches zero minute. Just before the time required reaches zero minute is just before the user who returns to the house 81 first returns thereto between the user of the first remote control terminal 5 and the user of the second remote control terminal 6.

Once the time required is zero minute, the server control unit 73 causes the server communication unit 71 to transmit, to the indoor unit 4, a command for allowing the temperature of a room where the indoor unit 4 is installed to reach the target indoor temperature on the basis of the information indicating the target indoor temperature included in the database.

As described above, the server 7 calculates the estimated time when the user who returns to the house 81 first among the plurality of users returns to the house 81, and transmits the command for changing the air conditioning setting to the air conditioner 2 in stages from the time when the estimated time is calculated to the estimated time calculated. Therefore, the air conditioning control system 1 can properly execute air conditioning for the plurality of users when the plurality of users is associated with the one air conditioner 2, and the plurality of users includes the user who returns to the house relatively early and the user who returns thereto relatively late.

Furthermore, the server 7 compares the times required for the plurality of users and transmits the command for changing the air conditioning setting to the air conditioner 2. Therefore, when the plurality of users is all out of the house 81, a difference between the temperature of the outside air at the time when the user who returns to the house the earliest among the plurality of users returns to the house and the temperature in the room of the house 81 is smaller than that of a case where the server 7 does not transmit the command for changing the air conditioning setting to the air conditioner 2. As a result, the air conditioning control system 1 can achieve air conditioning with relatively little heat shock.

In addition, the operation of the air conditioner 2 is stopped when the plurality of users is all out of the house 81, whereby the air conditioning control system 1 can achieve energy-saving air conditioning.

Second Embodiment

Next, an air conditioning control system according to a second embodiment will be described. The configuration of the air conditioning control system according to the second embodiment is the same as the configuration of the air conditioning control system 1 according to the first embodiment, but the function of a part of the components is different between the first embodiment and the second embodiment. The second embodiment mainly describes the part different from the first embodiment.

The server control unit 73 included in the server 7 determines that a part of the users has gone out when the part of the users among the plurality of users, which is indicated by the information included in the database stored in the server storage unit 72, has gone out of the house 81. When the server control unit 73 determines that the part of the users has gone out, the server communication unit 71 transmits a command for changing the air conditioning setting, which reduces a difference between the temperature detected by the temperature sensor 31 and the target indoor temperature, to the air conditioner 2, specifically the indoor unit 4.

When the command for changing the air conditioning setting is transmitted to the air conditioner 2, the server 7 notifies the user who is in the house 81 that the change of the air conditioning setting is started. When the user who is in the house 81 performs an operation related to the air conditioning setting in the case where the change of the air conditioning setting is performed, the air conditioner 2 cancels the change of the air conditioning setting.

Figure 4:
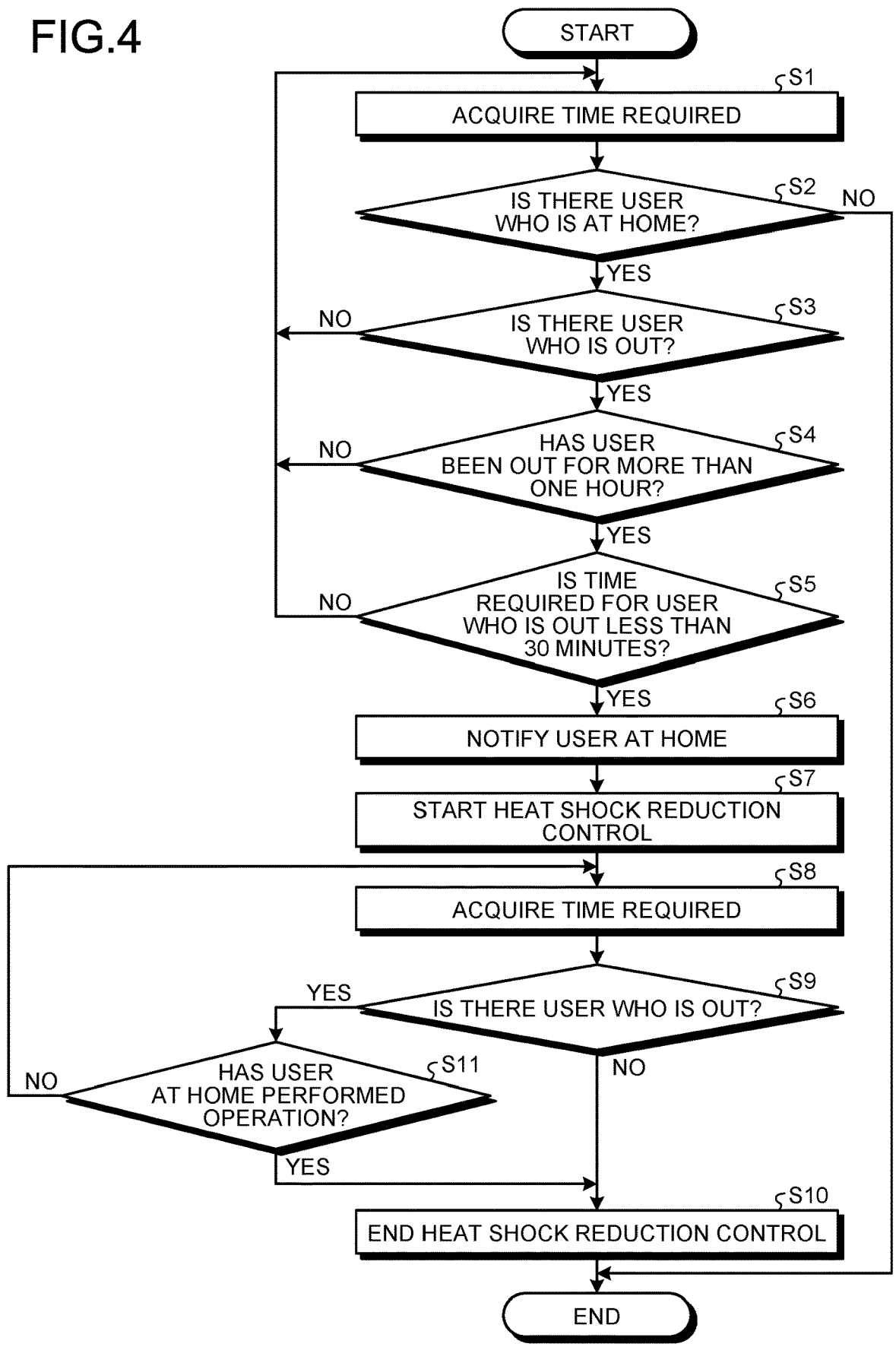
FIG. 4 is a flowchart illustrating an example of a procedure of the operation of a server included in the air conditioning control system according to a second embodiment.

FIG. 4 is a flowchart illustrating an example of a procedure of the operation of the server 7 included in the air conditioning control system according to the second embodiment. The server 7 acquires information indicating the time required from each of the first remote control terminal 5 and the second remote control terminal 6 (S1). That is, in step S1, the server 7 acquires from the first remote control terminal 5 the information indicating the time required that is the time required for the user of the first remote control terminal 5 to return to the house 81 from outside the house 81, and at the same time acquires from the second remote control terminal 6 the information indicating the time required that is the time required for the user of the second remote control terminal 6 to return to the house 81 from outside the house 81.

Next, the server 7 determines whether or not there is a user in the house 81 (S2). When determining that there is a user in the house 81 (Yes in S2), the server 7 determines whether or not there is a user who is out of the house 81 (S3). When determining that there is a user who is out (Yes in S3), the server 7 determines whether or not the user has been out for more than one hour (S4).

When determining that the user has been out for more than one hour (Yes in S4), the server 7 determines whether or not the time required for the user who is out to return to the house is less than 30 minutes (S5). When determining that the time required for the user who is out to return to the house is less than 30 minutes (Yes in S5), the server 7 notifies the user who is in the house 81 that air conditioning control for reducing heat shock is to be started (S6).

The "one hour" in step S4 and the "30 minutes" in step S5 are examples of criteria for determination, and one or both of the "one hour" and the "30 minutes" may be replaced with another time. For example, one or both of the "one hour" and the "30 minutes" may be changed by the user.

For example, when executing the operation of step S6, the server 7 transmits information to the remote control terminal that the air conditioning control for reducing heat shock is to be started, and causes the remote control terminal to display a message indicating the information. When executing the operation of step S6, the server 7 may transmit the information to the indoor unit 4 that the air conditioning control for reducing heat shock is to be started, and may cause a buzzer installed in the indoor unit 4 to sound or a light emitting diode installed in the indoor unit 4 to blink.

After executing the operation of step S6, the server 7 starts the air conditioning control for reducing heat shock (S7). Specifically, the server 7 stores information indicating the target indoor temperature at the start of the control, transmits a command for changing air conditioning setting for raising the target indoor temperature to the indoor unit 4 at the time of cooling, and transmits a command for changing air conditioning setting for lowering the target indoor temperature to the indoor unit 4 at the time of heating such that a difference between the target indoor temperature and the temperature of the outside air falls within a predetermined range.

The server 7 thereafter acquires information indicating the time required from each of the first remote control terminal 5 and the second remote control terminal 6 (S8). The server 7 determines whether or not there is a user who is out of the house 81 (S9). When determining that no user is out (No in S9), the server 7 ends the air conditioning control for reducing heat shock (S10). For example, in step S10, the server 7 transmits a command to the indoor unit 4 for changing the set temperature to the target indoor temperature at the start of the air conditioning control for reducing heat shock. When determining that there is a user who is out (Yes in S9), the server 7 determines whether or not a user who is at home has performed an operation related to air conditioning (S11).

When the server 7 determines that the user at home has performed the operation related to air conditioning (Yes in S11), the operation of the server 7 proceeds to step S10. When the server 7 determines that the user at home has not performed the operation related to air conditioning (No in S11), the operation of the server 7 proceeds to step S8.

The operation of the server 7 proceeds to step S1 when the server 7 determines in step S3 that no user is out (No in S3), determines that the user has been out for less than one hour (No in S4), or determines that the time required for the user who is out to return to the house is 30 minutes or longer (No in S5). The server 7 ends the processing when determining that there is no user in the house 81 (No in S2) and after performing the operation of step S10.

As described above, the air conditioning control system according to the second embodiment performs the air conditioning control for reducing heat shock on the basis of the time required even when not all the plurality of users are out. That is, even when a part of the users returns home later than the other users, the air conditioning control system according to the second embodiment can achieve air conditioning with relatively little heat shock for the part of the users.

Figure 5:
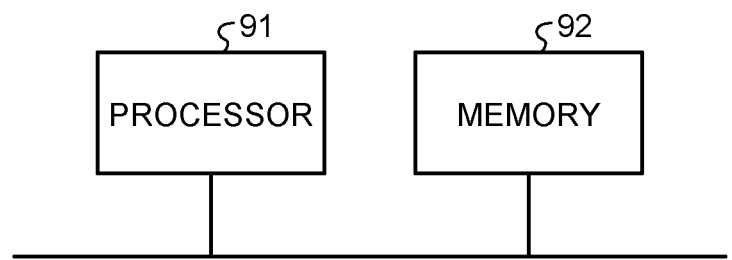
FIG. 5 is a diagram illustrating a processor when the processor implements a part or all of the functions of a terminal communication unit, a terminal control unit, a position detection unit, a reception unit, and a travel speed acquisition unit included in a first remote control terminal of the air conditioning control system according to the first embodiment.

FIG. 5 is a diagram illustrating a processor 91 when the processor 91 implements a part or all of the functions of the terminal communication unit 51, the terminal control unit 52, the position detection unit 53, the reception unit 56, and the travel speed acquisition unit 57 included in the first remote control terminal 5 of the air conditioning control system 1 according to the first embodiment. That is, a part or all of the functions of the terminal communication unit 51, the terminal control unit 52, the position detection unit 53, the reception unit 56, and the travel speed acquisition unit 57 may be implemented by the processor 91 that executes a program stored in a memory 92. The processor 91 is a central processing unit (CPU), a processing unit, an arithmetic unit, a microprocessor, or a digital signal processor (DSP). FIG. 5 also illustrates the memory 92.

In the case where the processor 91 implements a part or all of the functions of the terminal communication unit 51, the terminal control unit 52, the position detection unit 53, the reception unit 56, and the travel speed acquisition unit 57, the part or all of the functions are implemented by the processor 91 and software, firmware, or a combination of software and firmware. The software or firmware is described as a program and stored in the memory 92. The processor 91 implements a part or all of the functions of the terminal communication unit 51, the terminal control unit 52, the position detection unit 53, the reception unit 56, and the travel speed acquisition unit 57 by reading and executing the program stored in the memory 92.

When the processor 91 implements a part or all of the functions of the terminal communication unit 51, the terminal control unit 52, the position detection unit 53, the reception unit 56, and the travel speed acquisition unit 57, the first remote control terminal 5 includes the memory 92 for storing the program that results in the execution of a part or all of steps executed by the terminal communication unit 51, the terminal control unit 52, the position detection unit 53, the reception unit 56, and the travel speed acquisition unit 57. The program stored in the memory 92 can also be said to be one that causes a computer to execute a procedure or method executed by a part or all of the terminal communication unit 51, the terminal control unit 52, the position detection unit 53, the reception unit 56, and the travel speed acquisition unit 57.

The memory 92 is, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)); a magnetic disk; a flexible disk; an optical disk; a compact disc; a mini disc; a digital versatile disk (DVD); or the like.

Figure 6:
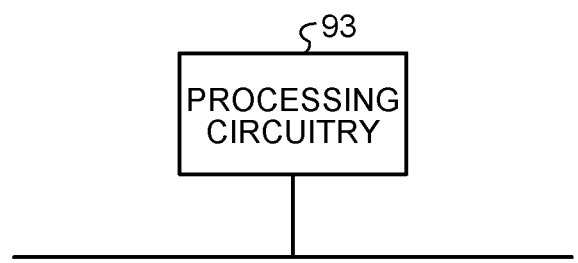
FIG. 6 is a diagram illustrating processing circuitry when the processing circuitry implements a part or all of the terminal communication unit, the terminal control unit, the position detection unit, the reception unit, and the travel speed acquisition unit included in the first remote control terminal of the air conditioning control system according to the first embodiment.

FIG. 6 is a diagram illustrating a processing circuitry 93 when the processing circuitry 93 implements a part or all of the terminal communication unit 51, the terminal control unit 52, the position detection unit 53, the reception unit 56, and the travel speed acquisition unit 57 included in the first remote control terminal 5 of the air conditioning control system 1 according to the first embodiment. That is, a part or all of the terminal communication unit 51, the terminal control unit 52, the position detection unit 53, the reception unit 56, and the travel speed acquisition unit 57 may be implemented by the processing circuitry 93.

The processing circuitry 93 is dedicated hardware. The processing circuitry 93 is, for example, a single circuit, a complex circuit, a programmed processor, a parallel-programmed processor, an application specific integrated circuit (ASIC), a field programmable gate array (FPGA), or a combination of these.

Some of the plurality of functions included in the terminal communication unit 51, the terminal control unit 52, the position detection unit 53, the reception unit 56, and the travel speed acquisition unit 57 may be implemented by software or firmware, while the rest of the plurality of functions may be implemented by dedicated hardware. The plurality of functions included in the terminal communication unit 51, the terminal control unit 52, the position detection unit 53, the reception unit 56, and the travel speed acquisition unit 57 can thus be implemented by hardware, software, firmware, or a combination of these.

A part or all of the functions of the terminal communication unit 61, the terminal control unit 62, the position detection unit 63, the reception unit 66, and the travel speed acquisition unit 67 included in the second remote control terminal 6 of the air conditioning control system 1 according to the first embodiment may be implemented by a processor that executes a program stored in a memory. The memory is a memory for storing the program that results in the execution of a part or all of steps executed by the terminal communication unit 61, the terminal control unit 62, the position detection unit 63, the reception unit 66, and the travel speed acquisition unit 67. A part or all of the functions of the terminal communication unit 61, the terminal control unit 62, the position detection unit 63, the reception unit 66, and the travel speed acquisition unit 67 may be implemented by processing circuitry. The processing circuitry is processing circuitry similar to the processing circuitry 93.

A part or all of the functions of the server communication unit 71, the server control unit 73, and the calculation unit 74 included in the server 7 of each of the air conditioning control system 1 according to the first embodiment and the air conditioning control system according to the second embodiment may be implemented by a processor that executes a program stored in a memory. The memory is a memory for storing the program that results in the execution of a part or all of steps executed by the server communication unit 71, the server control unit 73, and the calculation unit 74. A part or all of the functions of the server communication unit 71, the server control unit 73, and the calculation unit 74 may be implemented by processing circuitry. The processing circuitry is processing circuitry similar to the processing circuitry 93.

The configuration illustrated in the above each embodiment merely illustrates an example of the content of the present invention, and can thus be combined with another known technique or partially omitted and/or modified without departing from the gist of the present invention.

The invention claimed is:

1. An air conditioning control system comprising:
   an air conditioner;
   a plurality of remote control terminals each including a function of remotely controlling the air conditioner; and
   a server to control the air conditioner, wherein
   the air conditioner includes an outdoor unit including a temperature sensor to detect a temperature of outside air,
   the plurality of remote control terminals each includes a position detecting circuitry, a travel speed acquiring circuitry, a terminal memory to store information indicating a position of a building where the air conditioner is installed, a terminal controlling circuitry, and a terminal communicating circuitry,
   the position detecting circuitry detects a current position of a remote control terminal of the plurality of remote control terminals including the position detecting circuitry,
   the travel speed acquiring circuitry measures a speed of travel of the remote control terminal including the travel speed acquiring circuitry,
   the terminal controlling circuitry calculates a time required for a user of the remote control terminal including the terminal controlling circuitry to arrive at the building from outside the building on the basis of information obtained from the position detecting circuitry, the travel speed acquiring circuitry, and the terminal memory of the remote control terminal including the terminal controlling circuitry,
   the terminal communicating circuitry transmits, to the server, information indicating the time required that is calculated by the terminal controlling circuitry of the remote control terminal including the terminal communicating circuitry,
   the server includes a server memory to store a database that associates the air conditioner with the user of each of the plurality of remote control terminals, a server communicating circuitry to receive the information indicating the time required for the user of each of the plurality of remote control terminals from each of the plurality of remote control terminals, a server controlling circuitry to control the server communicating circuitry, and a calculating circuitry to calculate, on the basis of the information indicating the time required received by the server communicating circuitry, an estimated time at which a user who arrives at the building first arrives at the building among the plurality of users indicated by information included in the database, the server communicating circuitry transmits a command for changing an air conditioning setting to the air conditioner in stages such that a difference between the temperature of the outside air and a target indoor temperature is gradually increased as the time required decreases and is gradually decreased as the time required increases from a time when the calculating circuitry calculates the estimated time to the estimated time calculated by the calculating circuitry, and the server controlling circuitry causes the server communicating circuitry to transmit the command for changing the air conditioning setting to the air conditioner such that the difference between the temperature of the outside air and the target indoor temperature falls within a predetermined range just before the estimated time at which the user who arrives at the building first arrives at the building.

2. The air-conditioning control system according to claim 1, wherein, when the time required is determined to reach zero minutes, the server controlling circuitry causes the server communicating circuitry to transmit, to the indoor unit, a command that controls the air conditioning such that an indoor temperature where the indoor unit is installed is allowed to reach the target indoor temperature.

3. The air-conditioning control system according to claim 1, wherein when the plurality of users is determined to all be out of the building, and when the time required is determined to be greater than a predetermined reference time, the server controlling circuitry causes the server communicating circuitry to transmit, to the indoor unit, a command for stopping the air conditioning operation.

4. An air conditioning control system comprising:

an air conditioner;

a plurality of remote control terminals each including a function of remotely controlling the air conditioner; and a server to control the air conditioner, wherein the air conditioner includes an outdoor unit including a temperature sensor to detect a temperature of outside air, the plurality of remote control terminals each includes a position detecting circuitry, a travel speed acquiring circuitry, a terminal memory to store information indicating a position of a building where the air conditioner is installed, a terminal controlling circuitry, and a terminal communicating circuitry, the position detecting circuitry detects a current position of a remote control terminal of the plurality of remote control terminals including the position detecting circuitry, the travel speed acquiring circuitry measures a speed of travel of the remote control terminal including the travel speed acquiring circuitry, the terminal controlling circuitry calculates a time required for a user of the remote control terminal including the terminal controlling circuitry to arrive at the building from outside the building on the basis of information obtained from the position detecting circuitry, the travel speed acquiring circuitry, and the terminal memory of the remote control terminal including the terminal controlling circuitry, the terminal communicating circuitry transmits, to the server, information indicating the time required that is calculated by the terminal controlling circuitry of the remote control terminal including the terminal communicating circuitry, the server includes a server memory to store a database that associates the air conditioner with the user of each of the plurality of remote control terminals, a server controlling circuitry to determine that a part of a plurality of users indicated by information included in the database has gone out when the part of the users has gone out of the building, and a server communicating circuitry to transmit, to the air conditioner, a command for changing an air conditioning setting that reduces a difference between the temperature detected by the temperature sensor and a target indoor temperature when the server controlling circuitry determines that the part of the users has gone out, and when the time required for the user who is determined to have been out for at least a first predetermined time is less than a second predetermined time required for starting heat shock reduction control, the server transmits the command for changing the air conditioning setting for raising the target indoor temperature to the air conditioner at a time of cooling, and transmits the command for changing the air conditioning setting for lowering the target indoor temperature to the air conditioner at a time of heating such that the difference between the target indoor temperature and the temperature of the outside air falls within a predetermined range.

5. The air conditioning control system according to claim 4, wherein the server notifies the user who is in the building that a change of the air conditioning setting is started when the command for changing the air conditioning setting is transmitted to the air conditioner.

6. The air conditioning control system according to claim 5, wherein the air conditioner cancels the change of the air conditioning setting when the user who is in the building performs an operation related to the air conditioning setting in a case where the change of the air conditioning setting is performed.

7. The air conditioning control system according to claim 4, wherein the second predetermined time is less than the first predetermined time.

* * * * *